US009382969B2

(12) United States Patent
Kucharczyk et al.

(10) Patent No.: US 9,382,969 B2
(45) Date of Patent: Jul. 5, 2016

(54) BELT HAVING A TENSION MEMBER, IN PARTICULAR A CARBON TENSION MEMBER, WHICH IS PREPARED WITH A CROSS-LINKED POLYURETHANE, AND PREPARATION METHOD

(71) Applicant: ContiTech Antriebssysteme GmbH, Hannover (DE)

(72) Inventors: Andre Kucharczyk, Guelden (DE); Hubert Goeser, Dannenberg (DE); Markus Obert, Hannover (DE); Stephan Brocke, Hamburg (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 111 days.

(21) Appl. No.: 14/268,249

(22) Filed: May 2, 2014

(65) Prior Publication Data

US 2014/0243134 A1 Aug. 28, 2014

Related U.S. Application Data

(63) Continuation of application No. PCT/EP2012/071343, filed on Oct. 29, 2012.

(30) Foreign Application Priority Data

Nov. 2, 2011 (DE) .......................... 10 2011 054 978

(51) Int. Cl.
*F16G 1/28* (2006.01)
*F16G 5/20* (2006.01)
(Continued)

(52) U.S. Cl.
CPC *F16G 1/10* (2013.01); *B29D 29/08* (2013.01); *C08J 5/24* (2013.01); *F16G 1/16* (2013.01);
(Continued)

(58) Field of Classification Search
CPC ............... F16G 1/28; F16G 5/20; F16G 1/10; B29D 29/08; C08G 18/10
USPC ......................................... 474/204, 205, 260
See application file for complete search history.

(56) References Cited

U.S. PATENT DOCUMENTS 3,772,929 A * 11/1973 Redmond, Jr. ............ F16G 5/20
474/205
3,981,206 A 9/1976 Miranti, Jr. et al.
(Continued)

FOREIGN PATENT DOCUMENTS

DE 38 23 157 A1 2/1990
DE 10230306 A1 1/2004
(Continued)

OTHER PUBLICATIONS

International Search Report dated Mar. 6, 2013 of international application PCT/EP2012/071343 on which this application is based.

*Primary Examiner* — Henry Liu
(74) *Attorney, Agent, or Firm* — Walter Ottesen, P.A.

(57) ABSTRACT

A belt comprises at least a belt body made of a polymer material having elastic properties, the belt including a cover layer as a belt backing, a substructure having a force-transmission zone, and a tension member in a ribbed design embedded in the belt body. The tension member is prepared with a cross-linked polyurethane in such a way that the polyurethane fills at least part of the tension member cavities. The polyurethane filling material enters into a mechanical connection to the tension member on the one hand and an adhesive connection to the belt body on the other hand. The polyurethane filling material has a Shore A hardness that is 0.5 to 10 times harder than the Shore A hardness of the belt body. The belt body is preferably likewise made of cross-linked polyurethane, in particular using a carbon tension member.

15 Claims, 1 Drawing Sheet

(51) Int. Cl.
   *F16G 1/00* (2006.01)
   *F16G 5/00* (2006.01)
   *F16G 9/00* (2006.01)
   *F16G 1/10* (2006.01)
   *B29D 29/08* (2006.01)
   *C08J 5/24* (2006.01)
   *F16G 1/16* (2006.01)
   *F16G 5/14* (2006.01)
   *B29K 75/00* (2006.01)

(52) U.S. Cl.
   CPC .. *F16G 1/28* (2013.01); *F16G 5/14* (2013.01); *F16G 5/20* (2013.01); *B29K 2075/00* (2013.01); *C08J 2375/04* (2013.01)

(56) References Cited

U.S. PATENT DOCUMENTS

| | | | |
|---|---|---|---|
| 5,417,618 A | 5/1995 | Osako et al. | |
| 5,653,655 A | 8/1997 | Onoe et al. | |
| 5,807,194 A | 9/1998 | Knutson et al. | |
| 6,419,775 B1* | 7/2002 | Gibson | F16G 1/28 156/137 |
| 6,491,598 B1 | 12/2002 | Rosenboom | |
| 7,041,021 B2* | 5/2006 | Gibson | F16G 1/28 156/139 |
| 7,128,674 B2 | 10/2006 | Teves et al. | |
| 8,262,523 B2 | 9/2012 | Kanzow et al. | |
| 8,357,065 B2* | 1/2013 | Duke, Jr. | B29D 29/08 474/205 |
| 2002/0179228 A1* | 12/2002 | Gibson | F16G 1/28 156/139 |
| 2006/0174997 A1* | 8/2006 | Gibson | F16G 1/28 156/139 |
| 2008/0004145 A1* | 1/2008 | Duke | B29D 29/08 474/205 |
| 2008/0032130 A1 | 2/2008 | Akiyama et al. | |
| 2008/0032837 A1 | 2/2008 | Unruh et al. | |
| 2009/0142572 A1 | 6/2009 | Burlett | |
| 2009/0227406 A1* | 9/2009 | Wu | C08G 18/12 474/238 |
| 2011/0129647 A1* | 6/2011 | Duke, Jr. | C08G 18/10 428/156 |
| 2012/0071286 A1* | 3/2012 | Pasch | B29D 29/08 474/205 |
| 2013/0040771 A1* | 2/2013 | Well | F16G 1/28 474/205 |
| 2013/0225346 A1* | 8/2013 | Gibson | F16G 1/08 474/260 |
| 2013/0237356 A1* | 9/2013 | Pasch | B29D 29/08 474/205 |

FOREIGN PATENT DOCUMENTS

| | | |
|---|---|---|
| DE | 10 2007 062 285 A1 | 6/2009 |
| DE | 10 2008 012 044 A1 | 9/2009 |
| DE | 10 2009 044 153 A1 | 4/2011 |
| EP | 2 101 079 A2 | 9/2009 |
| WO | 2005/080821 A1 | 9/2005 |

* cited by examiner

BELT HAVING A TENSION MEMBER, IN PARTICULAR A CARBON TENSION MEMBER, WHICH IS PREPARED WITH A CROSS-LINKED POLYURETHANE, AND PREPARATION METHOD

CROSS REFERENCE TO RELATED APPLICATIONS

This application is a continuation application of international patent application PCT/EP2012/071343, filed Oct. 29, 2012, designating the United States and claiming priority from German application 10 2011 054 978.1, filed Nov. 2, 2011, and the entire content of both applications is incorporated herein by reference.

FIELD OF THE INVENTION

The invention relates to a belt comprising:
a belt body composed of a polymeric material having elastic properties and comprising a top ply as belt backing and a substructure having a power transmission zone; and also
a tensile member embedded in the belt body and being in cord construction, wherein the tensile member has been treated with a crosslinked polyurethane, formed from a polyurethane prepolymer and a crosslinker, in such a way that the polyurethane fills at least some of the tensile member voids, the polyurethane filling material forming both a mechanical attachment to the tensile member and an adherent bond with the belt body.

BACKGROUND OF THE INVENTION

A belt of the abovementioned type plays a prominent part in drive technology in particular. Such belts, which are also known as drive belts or power transmission belts, can be configured as flat belts, V-belts, V-ribbed belts, toothed belts or as composite cables. The power transmission zone corresponds to the belt drive. The following patent literature in particular is referenced in this regard: DE 38 23 157 A1; U.S. Pat. No. 7,128,674; U.S. Pat. No. 8,262,523; DE 10 2007 062 285 A1; DE 10 2008 012 044 A1; DE 10 2009 044 153 A1; U.S. Pat. No. 5,807,194; WO 2005/080821 A1; US 2008/0032837; US 2011/0129647; U.S. Pat. No. 3,981,206; U.S. Pat. No. 5,417,618; and, U.S. Pat. No. 6,491,598.

It is further known to use belts to convey materials, belts of this type also being referred to as transport belts or conveyor belts. The top ply serving as belt backing here would then be the carrying-side cover in contact with the conveyed material. The substructure would then in turn be the return-side cover, which is in contact with a driving drum.

An elastic belt is elastic because the belt body and thus the top ply and the substructure comprise a polymeric material having elastic properties, suitable materials here being in particular the two groups known as elastomers and thermoplastic elastomers. Elastomers based on a crosslinked mixture of rubber are particularly important, the mixture containing at least a rubber component and mixture ingredients. The rubber component used is more particularly ethylene-propylene rubber (EPM), ethylene-propylene-diene monomer rubber (EPDM), (partially) hydrogenated nitrile rubber (HNBR), fluoro rubber (FKM), natural rubber (NR), chloroprene rubber (CR), styrene-butadiene rubber (SBR), butadiene rubber (BR) or polyurethane (PU), which are cut with at least a further rubber component, in particular with one of the aforementioned types of rubber, for example in the form of an EPM/EPDM or SBR/BR blend, or uncut. HNBR, EPM, EPDM, PU or an EPM/EPDM blend are particularly important here. The mixture ingredients comprise at least a crosslinker or crosslinker system (crosslinking agent plus accelerant). Further mixture ingredients are usually also a filler and/or a processing aid and/or a plasticizer and/or an antioxidant and also optionally further added substances, for example fibers for reinforcement and color pigments. The general rubber-mixing arts are referenced in this regard.

The belt comprises an embedded tensile member which is formed of at least a tensile strand extending in belt longitudinal direction. Usually, two or more tensile strands combine to form a tensile member ply. Particular importance attaches here to a tensile strand in cord construction, for which various materials are possible according to the prior art. The preferred types of material are: steel, polyamide (PA), aramid, polyester, carbon, basalt, polyetheretherketone (PEEK), polyethylene terephthalate (PET), polybenzoxazole (PBO) or polyethylene 2,6-naphthalate (PEN).

Especially the power transmission zone of a belt for drive technology is endowed with an abrasion-resistant coating which additionally serves as a noise reducer and may also be rendered oil resistant. What is used for this purpose is a flocked add-on ply, in particular in the form of a cotton or aramid flock, a thin elastic polymeric layer filled with fibers (e.g., aramid fibers), a textile add-on ply, in particular in the form of a woven or knitted fabric, or a self-supporting film or sheet (e.g., a PTFE film or sheet) or a composite film or sheet (e.g., a PA-PTFE film or sheet). The woven fabric is of particular importance. The coatings recited here are usually treated on the contact side to the belt body, in particular to the substructure thereof, in an adherence-promoting manner, for example with a resorcinol-formaldehyde latex (RFL).

The prior art of polyurethane treatment of the tensile member will now be reviewed in more detail.

U.S. Pat. No. 5,807,194 discloses a toothed belt wherein the belt body includes a cast polyurethane. The embedded tensile member in cord construction is formed of carbon fibers together with a cord treatment. As the belt is cast, only some of the tensile member voids become filled with the cast polyurethane material. The disadvantage is that such a treatment of the tensile member with polyurethane is predicated on the fact that the belt body should likewise consist of a polyurethane of the same composition. No regard is accordingly had to the different properties of the carbon-type tensile member and of the belt body.

US 2011/0129647, then, discloses a belt, in particular a toothed belt and a V-ribbed belt, whose tensile member in cord construction, in particular carbon-type tensile member, has been treated with a crosslinked polyurethane. The fillage of the tensile member voids with the crosslinked polyurethane is preferably in the range from 20% to 100%. The polyurethane is further preferably formed from the following components A and B in particular:
component A: polyols selected from polyester polyols, polycarbonate polyols and polyether polyols;
component B: diisocyanates, in particular para-phenylene diisocyanate and 4,4'-methylenediphenyl diisocyanate.

A polyol is first reacted with a diisocyanate to form the polyurethane prepolymer, together with a subsequent crosslinking reaction with a diamine and/or with water, in particular only with water. In this connection, a "two-bath concept" is also presented as a method of treating the tensile member as part of an upstream processing stage. The tensile member is dipped into a mixture of a polyurethane prepolymer and an inert solvent/dispersant, the voids in the tensile member becoming at least partially filled with this mixture. This is followed by a drying operation. Finally a crosslinking reaction with water is carried out. This is followed by the manufacture of the belt using the tensile member thus treated.

The belt body itself may consist of a different material, although the preference is again for using a crosslinked polyurethane which, however, may have a different composition than the polyurethane for the tensile member treatment.

SUMMARY OF THE INVENTION

Seeking to further develop the teaching of US 2011/0129647, then, the problem addressed by the invention is that of providing a belt which enables a graduated transmission of force from the polymer material of the belt body into the tensile member. This is because the tensile member has a very high level of stiffness, while the belt body itself is relatively soft, which can create high shearing forces in the boundary region. In addition, the polyurethane filling material shall have very good mechanical attachment to the tensile member and very good chemical attachment to the belt body. The overall object of addressing this problem is therefore to provide a belt having a longer service life.

This problem is solved by the polyurethane filling material being from 0.5 to 10 Shore A harder than the belt body.

The advantageous design possibilities for the belt disclosed herein are:

The polyurethane filling material is from 2 to 5 Shore A harder than the belt body.

The polyurethane filling material fills at least 20%, in particular at least 30%, of the tensile member voids. A 100% fillage is also possible.

The polyurethane filling material is crosslinked via a diol, in particular a butanediol, in particular in turn via 1,4-butanediol. At the prepolymer formation stage, the polyols and diisocyanates presented in US 2011/0129647 can be used, for example.

The belt body itself can be formed of some other material. Preferably, the belt body likewise comprises a crosslinked polyurethane which, however, need not have the same composition as the polyurethane filling material.

The tensile member is formed of a fibrous material, in particular of carbon fibers, glass fibers, aramid fibers or—according to a recent development—of basalt fibers (DE 10 2009 044 153 A1). In the case of aramid fibers, para-aramid or meta-aramid can be used. However, tensile member formation from carbon fibers is particularly important.

The belt is used for drive technology in particular. For this the belt is configured as a toothed belt or as a V ribbed belt in particular.

It is a further object of this disclosure to provide a method of treating the tensile member of a belt of the aforementioned type wherein the treatment of the tensile member with a crosslinked polyurethane is economical, while satisfying the aforementioned requirements for the belt.

This problem is achieved by two method versions I or II, which will now be more particularly presented.
Method Version I The tensile member is drenched in a mixture of a polyurethane prepolymer, a crosslinker and an inert solvent or dispersant, for example, toluene, in a single treatment stage in the course of an upstream stage of the belt fabrication process, wherein the mixture fills at least some of the tensile member voids, and the treated tensile member is subsequently dried.

While the mixture is penetrating into the tensile member voids, a crosslinking reaction is already starting to occur, although further crosslinking (to completion) will usually take place in the course of the subsequent drying operation.
Method Version II The tensile member is drenched in a mixture of a polyurethane prepolymer, a crosslinker and an inert solvent or dispersant, again, for example, toluene, in each of two or more treatment stages likewise in the course of an upstream stage of the belt fabrication process, wherein each mixture fills at least some of the tensile member voids, and is subsequently dried.

Every treatment stage can employ the same mixture.

It is particularly advantageous for every treatment stage to employ a different mixture. This is because different treatment mixtures can serve to further optimize the desired degree of hardness/stiffness.

In addition, a drying operation is performed between every treatment stage.

With regard to the course of crosslinking during filling and drying, reference is made to method version I.

Method versions I and II, which differ from the treatment as taught by US 2011/0129647, both employ, preferably, a diol, in particular a 1,4 butanediol, as a crosslinker.

The tensile member treated according to both method versions I and II is then used for belt fabrication as disclosed. Otherwise, the prior belt technology art cited is referenced by way of example in respect of belt fabrication.

BRIEF DESCRIPTION OF THE DRAWINGS

The disclosure will now be explained with reference to the drawings wherein.

DESCRIPTION OF THE PREFERRED EMBODIMENTS OF THE INVENTION

Figure 1:
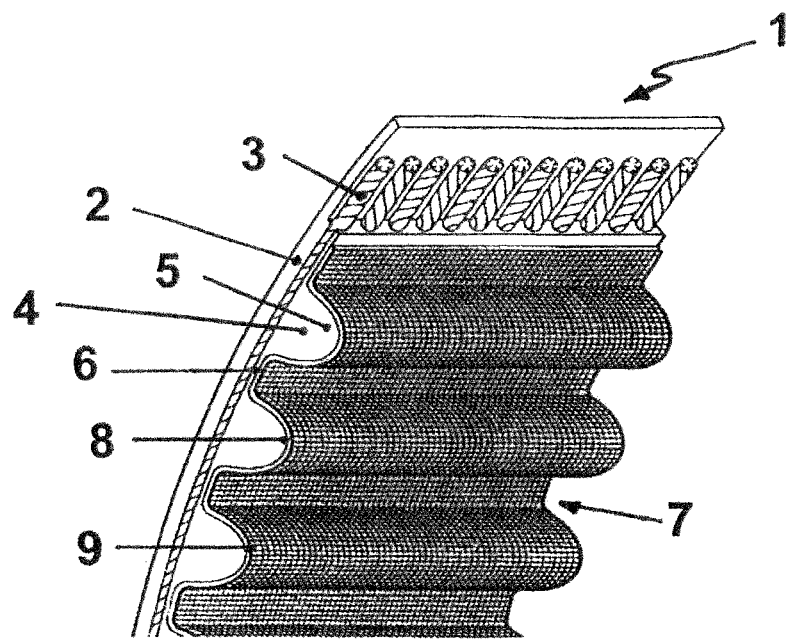
FIG. 1 shows a toothed belt.

FIG. 1 shows a belt 1 in the form of a toothed belt having a top ply 2 as belt backing, an embedded tensile member 3 having a plurality of tensile strands extending in belt longitudinal direction in a parallel arrangement, and also a substructure 4. The substructure has a tooth-shaped profile, comprising teeth 5 and indentations 6, and comprises the power transmission zone 7.

The top ply 2 and the substructure 4 combine to form as an overall unit the belt body composed of a polymeric material having elastic properties. With regard to the preferred type of material in this regard, reference is made to the introductory part of the description for the prior art. The use of crosslinked polyurethane is particularly important here.

Figure 2:
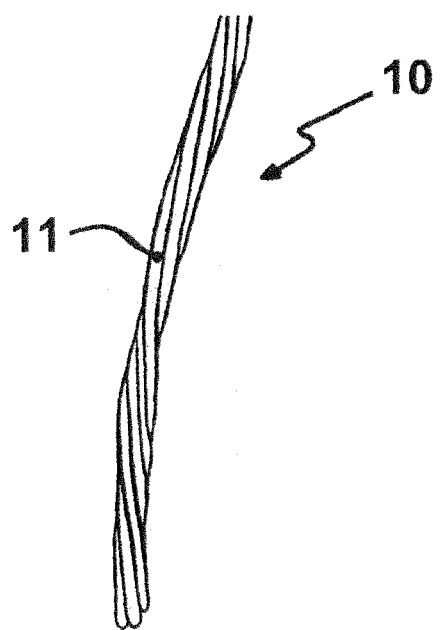
FIG. 2 shows a braid formed from filaments as basis for a cord construction.

The tensile member 3 in cord construction is formed in particular of carbon fibers, while the tensile member is treated with a crosslinked polyurethane, as will be more particularly elucidated in connection with FIG. 2.

The power transmission zone 7 of the belt is particularly susceptible to wear and tear due to abrasion, heat and the influence of oils. This is why a textile add-on ply 8, for example in the form of a woven fabric, is usually provided to the power transmission zone. This textile add-on ply is, for example as taught in the WO 2005/080821 A1 document, additionally impregnated with a fluorous plastic, which is in particular polytetrafluoroethylene (PTFE), to a high degree of fillage for the plastic, while at the same time a polymer coating (seal) is formed as an additional oil-resistant protective layer 9. The two sub-layers 8 and 9 with different functions have been here replaced by a conjoint protective layer.

A textile add-on ply, for example of the type described above, can also be provided to the top ply 2 of belt 1.

Belt 1 in its exemplary configuration of a toothed belt is particularly useful for driving an oil pump of an engine, for example of an automotive engine.

FIG. 2 shows a braid 10 formed of a group of filaments 11, where 100 to 1000 filaments, in particular 500 to 700 filaments, form one braid. The braid is usually in the form of a braid helix, as is illustrated in FIG. 2. A group of braids finally forms the cord. A cord usually consists of at least five braids, in particular of 10 to 20 braids.

Filaments 11 are formed of one fibrous material, in particular of carbon fibers. Fibrous filaments are also referred to in this context.

The entire cord construction, comprising the overall system of fibers, filaments and braids, contains voids, namely within the fibers and also between the filaments and braids, which are now at least partially filled with the crosslinked polyurethane in the course of the treatment, and the polyurethane filling material has a Shore A hardness which is greater by 0.5 to 10, in particular 2 to 5, than the belt body, combined with a very good mechanical attachment to the fibrous filaments and thus to the tensile member and with a very good chemical attachment to the belt body. In addition, this produces a soft transition of force, associated with reduced shear forces. This finally leads to a longer service life for the belt.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 belt in the form of a toothed belt
2 top ply as belt backing
3 tensile member
4 substructure
5 tooth
6 indentation
7 power transmission zone
8 textile add-on ply (tooth capping)
9 protective layer
10 braid
11 filament

What is claimed is:

1. A belt comprising:
   a belt body composed of a polymeric material having elastic properties and having a top ply as belt backing and a substructure having a power transmission zone; and,
   a tensile member embedded in the belt body and being in cord construction, wherein the tensile member has been treated with a crosslinked polyurethane filling material, formed from a polyurethane prepolymer and a crosslinker, in such a way that the polyurethane fills at least some of the tensile member voids, the polyurethane filling material forming both a mechanical attachment to the tensile member and an adherent bond with the belt body;
   wherein the polyurethane filling material has a Shore A hardness which is greater by 0.5 to 10 than the Shore A hardness of the belt body, and
   wherein a diol is used to crosslink the polyurethane filling material.

2. The belt as claimed in claim 1, wherein the polyurethane filling material has a Shore A hardness which is greater by 2 to 5 than the Shore A hardness of the belt body.

3. The belt as claimed in claim 1, wherein the polyurethane filling material fills at least 20% of the tensile member voids.

4. The belt as claimed in claim 3, wherein the polyurethane filling material fills at least 30% of the tensile member voids.

5. The belt as claimed in claim 1, wherein a butanediol is used to crosslink the polyurethane filling material.

6. The belt as claimed in claim 1, wherein the belt body consists of a crosslinked polyurethane.

7. The belt as claimed in claim 1, wherein the tensile member is formed of a fibrous material.

8. The belt as claimed in claim 7, wherein the fibrous material is selected from the group consisting of carbon fibers, glass fibers, aramid fibers, and basalt fibers or a mixture thereof.

9. The belt as claimed in claim 8, wherein the fibrous material consists of carbon fibers.

10. The belt as claimed in claim 1 for use in drive technology.

11. The belt as claimed in claim 10, wherein the belt is a toothed belt or a V-ribbed belt.

12. A method of treating the tensile member of a belt as claimed in claim 1, the method comprising:
    soaking the tensile member in a mixture of a polyurethane prepolymer, a crosslinker and an inert solvent or dispersant in a single treatment stage in the course of an upstream stage of the belt fabrication process, thereby filling at least some of the tensile member voids with the mixture; and,
    subsequently drying the treated tensile member.

13. A method of treating the tensile member of a belt as claimed in claim 1, the method comprising:
    soaking the tensile member in a mixture of a polyurethane prepolymer, a crosslinker and an inert solvent or dispersant in each of two or more treatment stages in the course of an upstream stage of the belt fabrication process, thereby filling in each of the two or more treatment stages some of the tensile member voids with the mixture; and,
    subsequently drying the treated tensile member.

14. The method as claimed in claim 13, wherein the same mixture is employed in each of the two or more treatment stages.

15. The method as claimed in claim 13, wherein a different mixture is employed in each of the two or more treatment stages.

* * * * *